Sept. 29, 1970          F. J. TYLER          3,531,152
MOTOR HOME
Filed Feb. 25, 1969
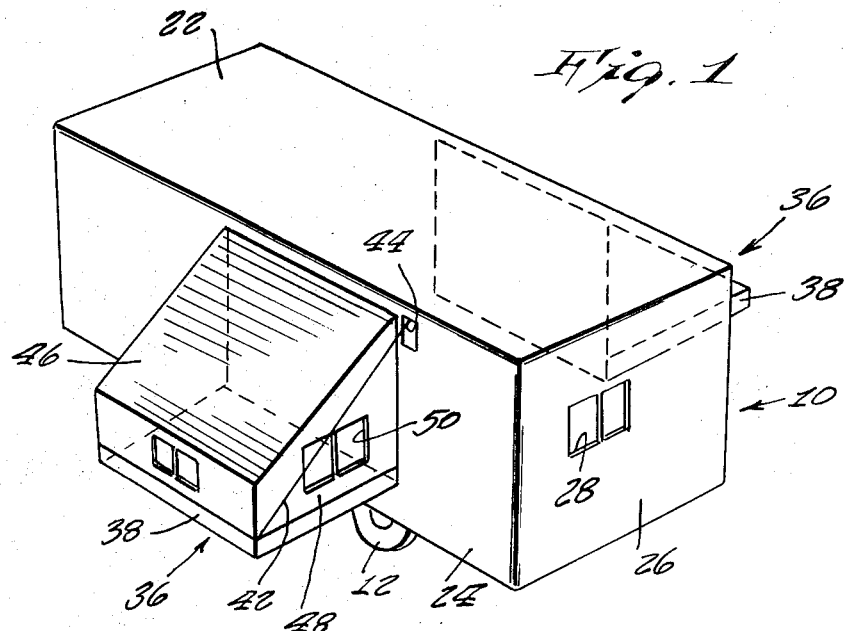
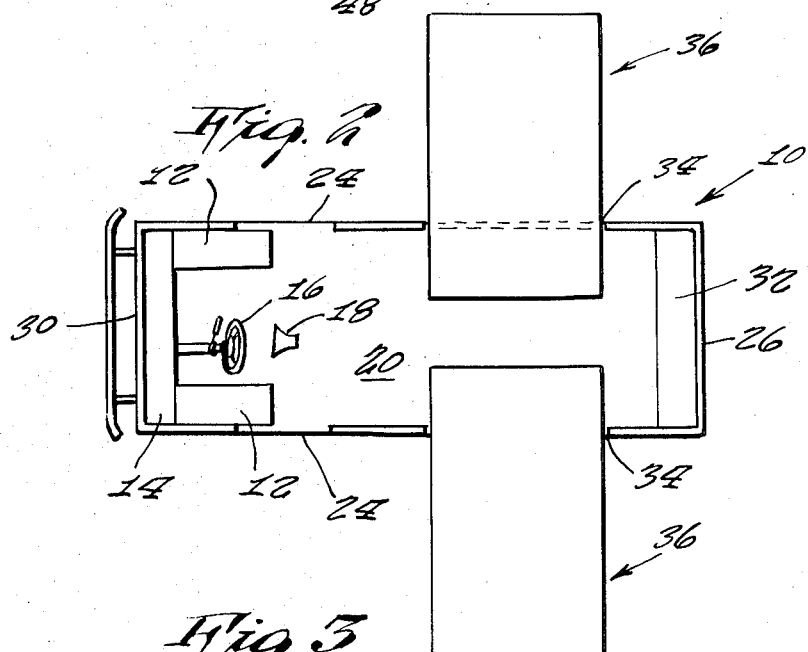
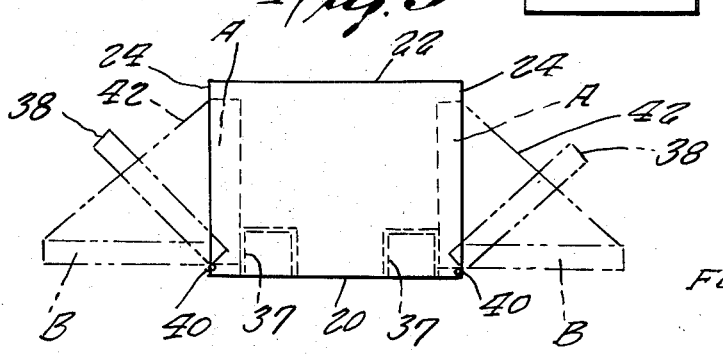
INVENTOR.
FELTON J. TYLER 3,531,152
MOTOR HOME
Felton J. Tyler, 2780 Crestline Drive,
Macon, Ga. 31204
Filed Feb. 25, 1969, Ser. No. 813,793
Int. Cl. B60p 3/32
U.S. Cl. 296—23                    1 Claim

ABSTRACT OF THE DISCLOSURE

A mobile home drawn by a vehicle having a bed mounted pivotably on each side wall which can fold outwardly to provide sleeping facilities.

---

My invention is directed toward mobile homes.

It is an object of my invention to provide a new and improved mobile home which is self-propelled and which I call Rome-N-Home.

Another object is to provide a new and improved mobile home of the character indicated which has two foldable side wings, each adapted to contain a double bed.

Still another object is to provide a new and improved mobile home of the character indicated which can be manufactured relatively easily and inexpensively.

All of the foregoing and still further objects and advantages of my invention will now be explained with reference both to this specification and to the accompanying drawings wherein:

FIG. 1 is a perspective view of my invention;
FIG. 2 is a plan view thereof; and
FIG. 3 is an end view thereof.

Referring now to FIGS. 1–3, there is shown a chassis having a conventional drive to four wheels 12 and supporting a hollow rectangular body 10 with a front motor 14 steering wheel 16 and driver's seat 18. Body 10 has a bottom 20, a flat roof 22, two oppositely disposed side walls 24, rear end wall 26 having a window 28 therein and a front end wall 30 carrying the front windshield. Bathroom and cooking facilities 32 are mounted on bottom 20 adjacent end wall 26. Each of the side walls has a vertical rectangular opening 34 from which a separate side wing 36 can be extended or retracted. Adjacent each opening 34 on the inside of the body is a combination seat and cabinet 37. A double bed 38 is hingedly secured at the bottom of its head as shown at 40 to the bottom horizontal edge of the corresponding opening. Each bed is secured by side cables 42 and a separate winch 44 whereby by manual operation, each bed can be swung to the vertical or stored position shown at A in dotted line in FIG. 3 or to the horizontal or use position shown in FIG. 2 and at B in dotted line in FIG. 3. As shown in FIG. 1, the cables 42 are positioned externally of the canvas enclosure; one end of each cable being secured to the outward end of the wing, the cable then extending at an angle (when viewed from overhead) respective to the canvas wing side wall, and the cable engaging winch 44 positioned in sidewardly spaced relation from the wing side wall, thus insuring the cable from clearing the wing during retraction and folding operation of the canvas into the body 10.

Secured to each bed are canvas top 46 and sides 48 each having a plastic window 50 which together constitute the side wing. Note that when the bed is swung to the stored position, the top 46 and sides 48 fold inward upon the bed whereby the side wings are fully retracted into the side walls to permit ease of motorized travel. When the vehicle is parked, the two wings can be swung outward and downward for sleeping use. Sides 48 will abut seats 37 when stored for travel, preventing opening of the sides and provide a seatback for the seats.

The novel features and the operation of this device will be apparent from the foregoing description. While the device has been shown and the structure described in detail, it is obvious that this is not to be considered limited to the exact form disclosed, and that changes may be made therein within the scope and the spirit of the invention.

Having thus set forth and disclosed the nature of this invention, what is claimed is:

1. In a mobile home, the combination of a chassis mounted upon a pair of wheels, a body upon said chassis, said body comprising a floor, a pair of side walls, a pair of end walls and a roof, each said side wall having an opening therethrough, and outwardly extendable wing mounted within each said opening, each said wing including an outwardly pivotable bed hingedly secured along a lower edge of said opening, a canvas canopy secured along the upper and side edges of said opening and along the outer and side edges of said bed to form a protective canopy over said bed in extended position, a pair of cables each having one end secured to an outerly extendable corner of said wing, each said cable extending angularly alongside said wing to a winch mounted in sidewardly spaced relation from a side of said wing so to clear said wing during collapsing operation, including cabinets in said body abutting the bed in the collapsed position and wherein each wing includes sides which fold inwardly upon the bed in the collapsed position, said cabinets holding the sides from opening when stored for travel.

References Cited
UNITED STATES PATENTS
1,320,794    11/1919    Palmer   ------------  296—23.2

PHILIP GOODMAN, Primary Examiner

U.S. Cl. X.R.

52—72